Feb. 6, 1968     R. C. TONNE     3,367,678
HITCH STRUCTURE FOR AGRICULTURAL IMPLEMENTS
Filed Oct. 21, 1965
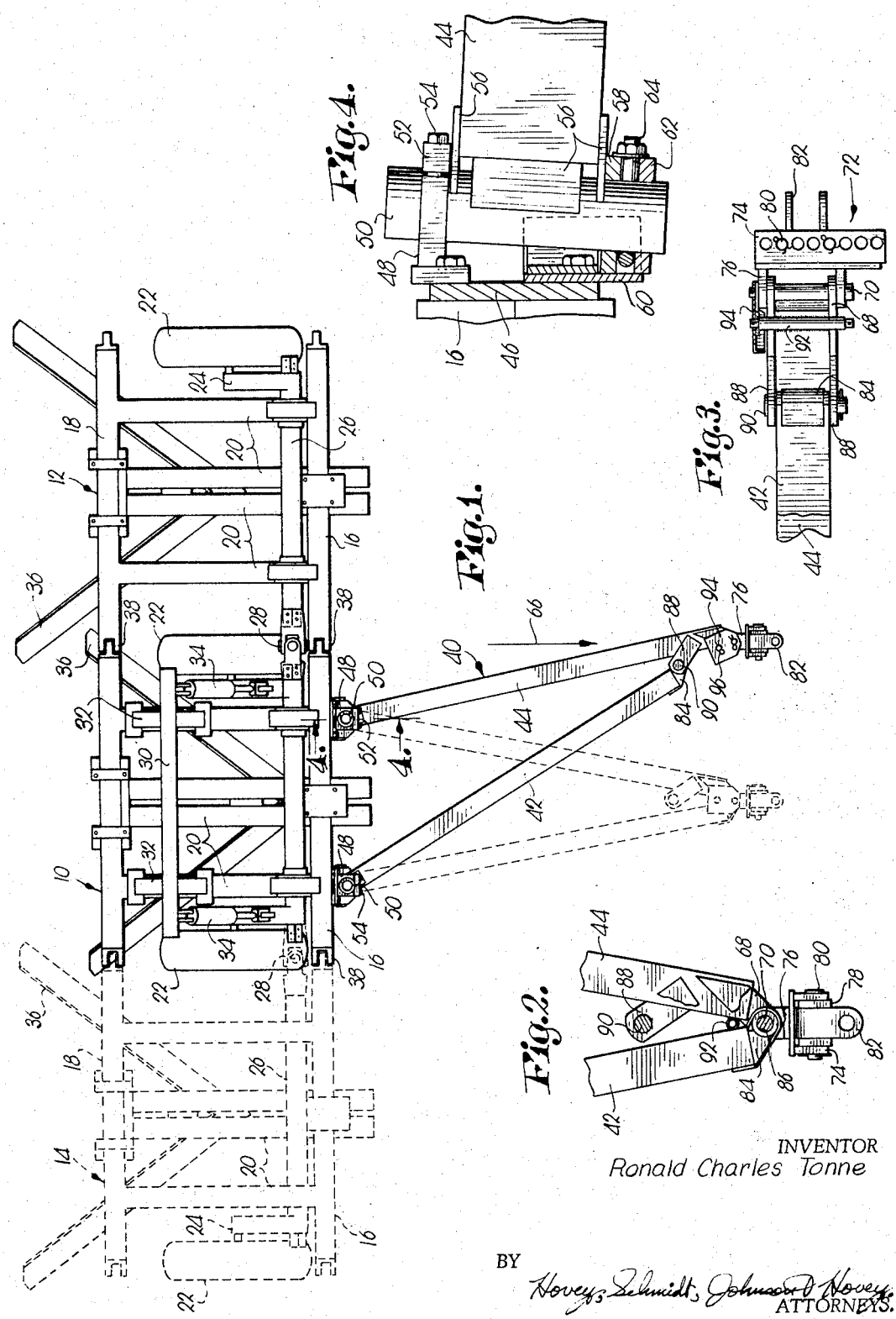
INVENTOR
Ronald Charles Tonne
BY
Hovey, Schmidt, Johnson & Hovey
ATTORNEYS.

United States Patent Office 3,367,678
Patented Feb. 6, 1968

3,367,678
HITCH STRUCTURE FOR AGRICULTURAL
IMPLEMENTS
Ronald Charles Tonne, Norton, Kans., assignor to
Richardson Manufacturing Company, Inc., Cawker
City, Kans., a corporation of Kansas
Filed Oct. 21, 1965, Ser. No. 500,148
8 Claims. (Cl. 280—411)

ABSTRACT OF THE DISCLOSURE

A center draft hitch for a multiple section implement having a primary section and one or more removable secondary sections wherein the line of draft may always be maintained in the center of the implement regardless of the number of sections used. The hitch has a pair of rigid arms pivotally connected to the primary section and structure permitting coupling of the outer end of one of the arms to the other arm at any one of a number of points along the length thereof located to cause the line of draft to be centered with the primary implement section when coupled at one point and to be centered between the pair of sections when one secondary section is used with the primary section.

---

This invention relates to an adjustable hitch for agricultural implements which provides draft centering regardless of the number of implement sections being drawn.

Agricultural implements, particularly stubble mulch plows or the like, commonly comprise detachable sections which enable the transverse dimension of the implement to be controlled as desired. In a single section unit it will be appreciated that no substantial problem of draft centering is presented; however, as additional sections are added, the draft will be centered only if equal numbers of sections are attached to each side of the center section to which the tractor or other prime mover is hitched. Thus, a hitch for a three-section plow is unsuitable for a two-section plow since the draft for the two-section unit must be centered between the adjacent sections.

It is, therefore, the primary object of this invention to provide a hitch which is selectively positionable in order to provide draft centering regardless of the section combination utilized.

A further object is to provide a hitch as aforesaid which is shiftable between its operative positions by swinging the hitch arms with respect to the implement, thereby obviating the necessity of uncoupling the hitch from the implement and facilitating rapid adjustment thereof.

In the drawing:

FIGURE 1 is a top plan view of an implement showing the hitch connected thereto;

FIG. 2 is a fragmentary, horizontal sectional view of the forward end of the hitch;

FIG. 3 is a side elevational view of the forward end of the hitch; and

FIG. 4 is a vertical sectional view taken along line 4—4 of FIG. 1.

FIGURE 1 shows a conventional stubble mulch plow having a primary section 10 and a pair of secondary sections 12 and 14, the latter section being shown in phantom lines. Each of the sections comprises a pair of front and rear transverse frame members 16 and 18, four cross members 20 interconnecting members 16 and 18, and one or more wheels 22 each carried by a respective leg 24 rigid with a sectionalized shaft 26. A pair of universal joints 28 are utilized to interconnect the shaft sections of respective plow sections, the primary plow section 10 being provided with an elevated, transverse bar 30 supported by standards 32. A pair of hydraulic piston and cylinder assemblies 34 are coupled between bar 30 and shaft 26 in a manner to effect rotation thereof to swing legs 24 to, in turn, raise or lower wheels 22 to thereby position the sweep blades 36 of respective plow sections at a selected level. Interconnection of the plow sections is effected by a clevis and pin coupling 38 at mating ends of adjacent transverse frame members 16 and 18.

A hitch 40 comprising the instant invention has a pair of hitch arms 42 and 44 each connected to the transverse member 16 of primary section 10 in the same manner; thus, only the connection of arm 44 with member 16 will be described herein. A mounting plate 46 (FIG. 4) is bolted to member 16 and has a block segment 48 rigidly secured thereto which receives an upright pipe 50. A block segment 52 is shiftable toward and away from segment 48 by a pair of drawbolts 54 to a position where segments 48 and 52 snugly receive pipe 50 but permit rotation thereof about its longitudinal axis. Pipe 50 is welded to four plate members 56 projecting from the rearward end of arm 44, the lower plate member 56 resting on a bearing plate 58 rigid with a bracket 60 bolted to mounting plate 46 and member 16. A bottom plate 62 rigid with bracket 60 is spaced below plate 58, the plates 58 and 62 being apertured to receive pipe 50 and also receiving a U-bolt 64 therebetween. U-bolt 64 is tightened sufficiently to snugly engage pipe 50 but does not inhibit rotation thereof.

The solid lines in FIG. 1 illustrate the utilization of hitch 40 when it is desired to provide center draft for a two-section plow combination. The arrow 66 illustrates that the line of draft is aligned with joints 38 interconnecting sections 10 and 12. The phantom lines illustrate the position of the hitch when a single section or a three-section unit is being drawn, in which case the draft is centered on the primary section 10.

FIGURE 2 illustrates the forward ends of arms 42 and 44 when the draft is centered on section 10, while FIG. 3 illustrates the arm positions when the draft is centered as indicated by arrow 66. Arm 44 is provided with an offset clevis 68 at its forward end which projects angularly therefrom and receives a pintle 70 forming a part of a conventional coupling 72. The coupling is utilized to connect the hitch to the frame of a tractor or other prime mover (not shown) and is provided with an upright channel 74 having a clevis 76 projecting rearwardly therefrom and receiving the clevis 68 of arm 44. A horizontally disposed, tubular element 78 is vertically shiftable in channel 74 and is held at a desired level by a pair of fasteners 80. A U-shaped strap 82 receives element 78 and projects forwardly therefrom for connection to the tractor frame, thereby providing a horizontal axis in coupling 72 to permit relative movement of the hitch and the tractor as the latter and the implement are being drawn to follow the contour of the ground.

The forward end of arm 42 is provided with an angularly extending connector element 84 having an offset opening 86 therein for receiving pintle 70 when it is desired to center the draft on section 10 (FIG. 2). Arm 44 is provided with an additional coupling component comprising a pair of laterally extending links 88 projecting from arm 44 and apertured to receive an upright pin 90. To center the draft between sections 10 and 12, arm 42 is disconnected from coupling 72 and swung to a position where element 84 is received between links 88, whereupon pin 90 is inserted through the links and opening 86 and maintained in place by a cotter pin or other suitable means (FIG. 3).

A locking pin 92 is welded to the inner side of arm 44 adjacent its forward end and has a reduced, upper extremity which is received by an apertured locking plate 94. Pintle 70 also has a reduced upper extremity which extends through locking plate 94, both exposed extremities having transverse holes for receiving cotter pins 96 (FIG. 1). In this manner, vertical movement of pintle 70 and hence the danger of inadvertent uncoupling is prevented. Locking plate 94 may be installed with the wide end forward for arresting swivel freedom from clevis 76.

From the foregoing, it is apparent that change-over from a load having an odd number of sections to a load having an even number of sections is readily accomplished by removing pintle 70 and swinging arms 42 and 44 to the full-line positions shown in FIG. 1. Pin 90 is then inserted through links 88 and opening 86 and secured in place, whereupon coupling 72 is re-attached to arm 44 by reinserting pintle 70 through clevises 76 and 68. Thus, the dual purpose hitch eliminates the necessity of changing hitches with varying loads and provides center draft operation regardless of the number of sections being drawn.

Having thus described the invention, what is claimed as new and desired to be secured by Letters Patent is:

1. For use with an agricultural implement having a primary section, a center draft hitch for drawing the implement either as a single section unit or as a multiple section unit having one or more additional, secondary sections, said hitch comprising:
   a pair of rigid hitch arms each having opposed, forward and rearward ends;
   means for coupling said rearward ends to said primary section in laterally spaced relationship to each other for swinging movement of said arms about upright axes; and
   a coupling for attaching the forward end of one of said arms to a drawing vehicle,
   the other of said arms having structure for rigidly coupling it to said one arm at either of a pair of connecting points spaced along said one arm,
   a first of said points being disposed to center the draft on said primary section and between said axes when said structure is connected thereto,
   the second of said points being disposed to center the draft between said primary section and an adjacent secondary section and outboard of said axes when said structure is connected thereto, whereby said arms may be swung to the center draft position determined by the number of implement sections being drawn, and the arms intercoupled at the appropriate connecting point.

2. The invention of claim 1,
   said one arm being provided with a component between the ends thereof engageable with said structure and presenting one of said points.

3. The invention of claim 1,
   said points being remote from the rearward end of said one arm.

4. The invention of claim 3,
   said forward end of the one arm having connector means presenting one of said connecting points.

5. The invention of claim 4,
   said structure being disposed at the forward end of said other arm,
   said coupling releasably interconnecting said structure and said connector means.

6. The invention of claim 3,
   said structure being disposed at the forward end of said other arm,
   said forward end of said one arm having connector means presenting said first connecting point,
   said one arm being provided with a component between the ends thereof engageable with said structure and presenting said second connecting point,
   said coupling releasably interconnecting said structure and said connector means whereby, upon release of said coupling, said arms may be swung to dispositions where said structure is brought into engagement with said component.

7. The invention of claim 6,
   said component comprising a laterally extending link rigid with said one arm and provided with an upright pin,
   said structure comprising a connector element rigid with said other arm and having an upright opening therein for receiving said pin,
   said opening being offset with respect to the longitudinal axis of said other arm.

8. The invention of claim 7,
   said connector means comprising an offset clevis rigid with said one arm for receiving said element,
   said coupling having a pintle receivable by said clevis and said opening.

References Cited
UNITED STATES PATENTS

| | | | |
|---|---|---|---|
| 1,299,561 | 4/1919 | Donovan | 280—411 |
| 2,060,196 | 11/1936 | Goodman | 280—411 |

OTHER REFERENCES

Poensgen, Fritz: German printed application, p. 11334, published on July 12, 1956.

LEO FRIAGLIA, *Primary Examiner.*